Patented Nov. 4, 1947

2,430,249

UNITED STATES PATENT OFFICE 2,430,249

CATALYTIC CRACKING OF PARTIALLY OXIDIZED HYDROCARBONS

Robert F. Ruthruff, Chicago, Ill.

No Drawing. Original application June 16, 1941, Serial No. 398,242. Divided and this application April 19, 1945, Serial No. 589,260

4 Claims. (Cl. 196—49)

The synthetic silica-alumina contact agents of the prior art have been used in converting partially oxidized liquid hydrocarbons of higher boiling point, for example, the products formed by treating hydrocarbons with air at an elevated temperature in the presence or not of a suitable oxidation catalyst as desired, into gasoline of high octane number. Methods for achieving such partial oxidation have been described in detail in the art. Briefly, one suitable method for accomplishing this partial oxidation comprises vaporizing a hydrocarbon fraction and passing the vapors at 450° to 750° F. to a reaction vessel wherein they are contacted with 300 to 600 volumes of air (measured as gas at standard conditions) per liquid volume of oil charged. The air is preferably introduced portionwise at a plurality of points along the reaction vessel which may contain an oxidizing catalyst if desired, such as vanadium oxide on pumice. The resulting products are worked up as usual and water (containing certain water soluble oxidation products) is separated from the partially oxidized liquid hydrocarbons containing from 3 to 8% oxygen, more or less. When these partially oxidized liquid hydrocarbons are processed in the presence of synthetic silica alumina catalysts of the prior art (many of which have been described in certain of my copending applications such as S. N. 305,472, filed November 21, 1939, now U. S. Patent 2,391,481, issued December 25, 1945; S. N. 305,473, filed November 21, 1939, now U. S. Patent 2,391,482, issued December 25, 1945; S. N. 313,898, filed January 15, 1940, now U. S. Patent 2,323,728, issued July 6, 1943; S. N. 317,770, filed February 7, 1940, now U. S. Patent 2,320,799, issued June 1, 1943; S. N. 334,731, filed May 13, 1940, now U. S. Patent 2,312,445, issued May 2, 1943; S. N. 346,809, filed July 22, 1940, now U. S. Patent 2,366,217, issued January 2, 1945, and S. N. 277,580, filed June 6, 1939, now U. S. Patent 2,353,624, issued July 11, 1944) gasoline of high octane number is produced. The process is particularly applicable to the treatment of refractory cycle stocks produced by the once through catalytic cracking of virgin fractions. Such cycle stocks are partially oxidized as described above, or otherwise, and the liquid partially oxidized hydrocarbon products are then catalytically cracked, either alone or in admixture with virgin charge.

When the synthetic silica-alumina catalytic agents of the prior art are employed to convert partially oxidized liquid hydrocarbons of higher boiling point into hydrocarbons of lower boiling point a comparatively rapid and permanent decline in the activity of said contact agents is observed. This I attribute to the deleterious action of the steam produced on decomposition of the partially oxidized liquid hydrocarbon charge although I do not wish to be bound by any theory proposed to explain the observed facts. At any rate, I have found that silica-magnesia catalysts, such as the synthetic magnesium silicate described below, the silica-magnesia catalyst described in my copending application S. N. 300,390, filed October 20, 1939, now U. S. Patent 2,278,590, issued April 7, 1942, silica-magnesia catalysts prepared by the hydrothermal action of a magnesium compound, such as basic magnesium carbonate, on finely divided siliceous material, silica-magnesia catalysts prepared by the interaction of a soluble silicate, e. g. sodium silicate and a soluble magnesium salt, e. g. magnesium chloride, silica-magnesia catalysts prepared by the interaction of a preferably partially hydrolyzed alkyl silicate, such as partially hydrolyzed ethyl ortho silicate, and an aqueous solution of a soluble magnesium salt such as magnesium chloride and silica-magnesia catalysts prepared by other known methods are more effective for the purpose, the same being true of natural magnesium silicates such as Hector clay, Coenite, sepiolite and the like, especially after these natural compounds have been activated by a light acid treatment. The use of the synthetic magnesium silicate described below as a contact agent for converting partially oxidized liquid hydrocarbons into hydrocarbons of lower boiling point is described in the following illustrative but non-limiting examples. Other silica magnesia contact agents behave in a similar manner.

The synthetic magnesium silicate referred to above contains, on a water-free basis, 80 to 85% by weight of silica, 10 to 15% magnesia, about 5% calcium oxide and about 1% $R_2O_3$ (comprising approximately equal parts of alumina and iron oxide). A typical sample exhibits a silica to magnesia ratio of 7.3 by weight or 4.9 on the mole basis. As produced, this synthetic magnesium silicate contains an appreciable amount of water—in the neighborhood of 5%.

*Example 1*

A light gas oil boiling in the range 375° to 650° F. was heated to a temperature of about 680° F. and passed through a catalytic oxidation reactor packed with pumice bearing vanadium pentoxide thereon, the oil feed rate being 1.75 liquid volumes per hour per volume of reactor space. During passage of one volume of oil (measured as liquid)

through the reactor, a total of 500 volumes of air (measured at standard conditions) were added. The air was added to the reactor in four equal portions, the first at the entrance of the reactor, the second one-quarter through the reactor, the third at the midpoint of the reactor and the fourth portion three-quarters through the reactor. The reaction products were cooled and separated and water was removed from the liquid portion. The partially oxidized liquid hydrocarbons were fractionated and about 15% material of gasoline boiling range discarded. The bottoms were heated to a temperature of 1000° F. and passed at a rate of 3.0 liquid volumes per hour per volume of catalytic reactor space, the reactor being filled with pellets of the synthetic magnesium silicate described above. The resulting product contained 25% by volume of gasoline of 80 octane number.

*Example 2*

Midcontinent gas oil of 35° A. P. I. gravity was heated to a temperature of 900° F. and passed through a reactor filled with pellets of acid-treated bentonite at a rate of 2.25 liquid volumes of charge per hour per volume of catalyst space. The catalyst was maintained at the previously mentioned temperature. The products contained 18% gasoline of 80 octane number. The cycle stock produced in this operation was partially oxidized substantially as described with respect to the gas oil charge of Example 1 and the partially oxidized liquid product was heated to a temperature of 1000° F. and passed through a reactor filled with pellets of the synthetic magnesium silicate described above and maintained at 1000° F., the charge rate being 3.0 liquid volumes per hour per volume of catalyst space. The product contained 24% gasoline by volume of 80 octane number.

As mentioned previously, while the synthetic silica-alumina cracking catalysts of the prior art can be used to convert partially oxidized liquid hydrocarbons of higher boiling point to hydrocarbons of lower boiling point, much more satisfactory results are obtained on using silica-magnesia catalysts such as the synthetic magnesium silicate described above, due presumably to the relative insensitivity to steam of this last named class of contact agents. Natural silica-alumina catalysts, such as acid-treated bentonites and the like are more resistant to steam deactivation than synthetic silica-alumina catalysts but unfortunately these natural materials exhibit a gradual decline in activity during use that is permanent and hence they too are less effective than silica-magnesia catalysts when partially oxidized hydrocarbons are processed.

This application is a division of my copending application, S. N. 398,242, filed June 16, 1941.

While the instant invention has been described in connection with details and specific examples thereof, it is not intended that these shall be regarded as limitations upon the scope or spirit of the instant invention except insofar as these may be included in the accompanying claims.

I claim:

1. In the process of making motor fuel of gasoline type from mineral oil, the steps comprising cracking a portion of mineral oil in the presence of a silica base cracking catalyst and in the absence of added oxygen to convert a part thereof into gasoline-type motor-fuel, fractioning the product to separate out the lighter gasoline portion, then partially-oxidizing a heavier fraction under conditions which form a material percentage of oxygen derivatives of hydrocarbons and recracking said partially-oxidized heavier fraction containing said oxygen derivatives of hydrocarbons to produce further amounts of gasoline-type motor fuel.

2. In the process of making motor fuel of gasoline type from mineral oil, the steps comprising cracking a portion of mineral oil in the presence of a silica base cracking catalyst and in the absence of added oxygen to convert a part thereof into gasoline-type motor fuel, fractioning the product to separate out the lighter gasoline portion, then partially-oxidizing a heavier fraction in vapor phase under conditions which form a material percentage of oxygen derivatives of hydrocarbons and recracking said partially-oxidized heavier fraction containing said oxygen derivatives of hydrocarbons to produce further amounts of gasoline-type motor fuel.

3. In the process of making motor fuel of gasoline type from mineral oil, the steps comprising cracking a portion of mineral oil in the presence of a silica base cracking catalyst and in the absence of added oxygen to convert a part thereof into gasoline-type motor fuel, fractioning the product to separate out the lighter gasoline portion, then partially-oxidizing a heavier fraction under conditions which form a material percentage of oxygen derivatives of hydrocarbons and recracking said partially oxidized heavier fraction in vapor phase to produce further amounts of gasoline-type motor fuel.

4. In the process of making motor fuel of gasoline type from mineral oil, the steps comprising cracking a portion of mineral oil in the presence of a silica base cracking catalyst and in the absence of added oxygen to convert a part thereof into gasoline type motor fuel, fractionating the product to separate out the lighter gasoline portion, then partially oxidizing a heavier fraction in vapor phase under conditions which form a material percentage of oxygen derivatives of hydrocarbons and recracking said partially oxidized heavier fraction in vapor phase to produce further amounts of gasoline type motor fuel.

ROBERT F. RUTHRUFF.

REFERENCES CITED

The following references are of record in the file of this patent:

UNITED STATES PATENTS

| Number | Name | Date |
|---|---|---|
| 1,597,796 | James | Aug. 31, 1926 |
| 2,347,805 | Bell | May 2, 1944 |
| 2,054,571 | James | Sept. 15, 1936 |
| 2,390,556 | Ruthruff | Dec. 11, 1945 |
| 2,085,499 | James | June 29, 1937 |